United States Patent [19]

Castille

[11] Patent Number: 4,978,964
[45] Date of Patent: Dec. 18, 1990

[54] LIGHT REFLECTING ANTENNA BALL

[76] Inventor: James Castille, 910 N. Enterprise, Inglewood, Calif. 90302

[21] Appl. No.: 348,402

[22] Filed: May 8, 1989

[51] Int. Cl.⁵ .............................................. B60R 13/00
[52] U.S. Cl. .................................... 343/715; D14/230; 343/720; 428/11; 428/31
[58] Field of Search .................. 428/11, 31; D14/230; 52/301; 343/711, 715, 720, 894, 900

[56] References Cited

U.S. PATENT DOCUMENTS 2,329,046 9/1943 Halbig ..................................... 428/28
4,425,602 1/1984 Lansing ............................. 428/11 X
4,526,820 7/1985 Haas ....................................... 428/31

Primary Examiner—Henry F. Epstein
Attorney, Agent, or Firm—Erik M. Arnhem

[57] ABSTRACT

An ornament installable on an automotive vehicle antenna to achieve a colorful light reflecting effect at night. A threaded socket within the ornament threadably receives a split plug that extends around a rod portion of the antenna. A spherical enlargement on the antenna is located within the socket inwardly from the split plug, so that the ornament is prevented from being separated from the antenna. The plug can be manually unscrewed from the socket to permit removal of the ornament from the antenna.

5 Claims, 1 Drawing Sheet

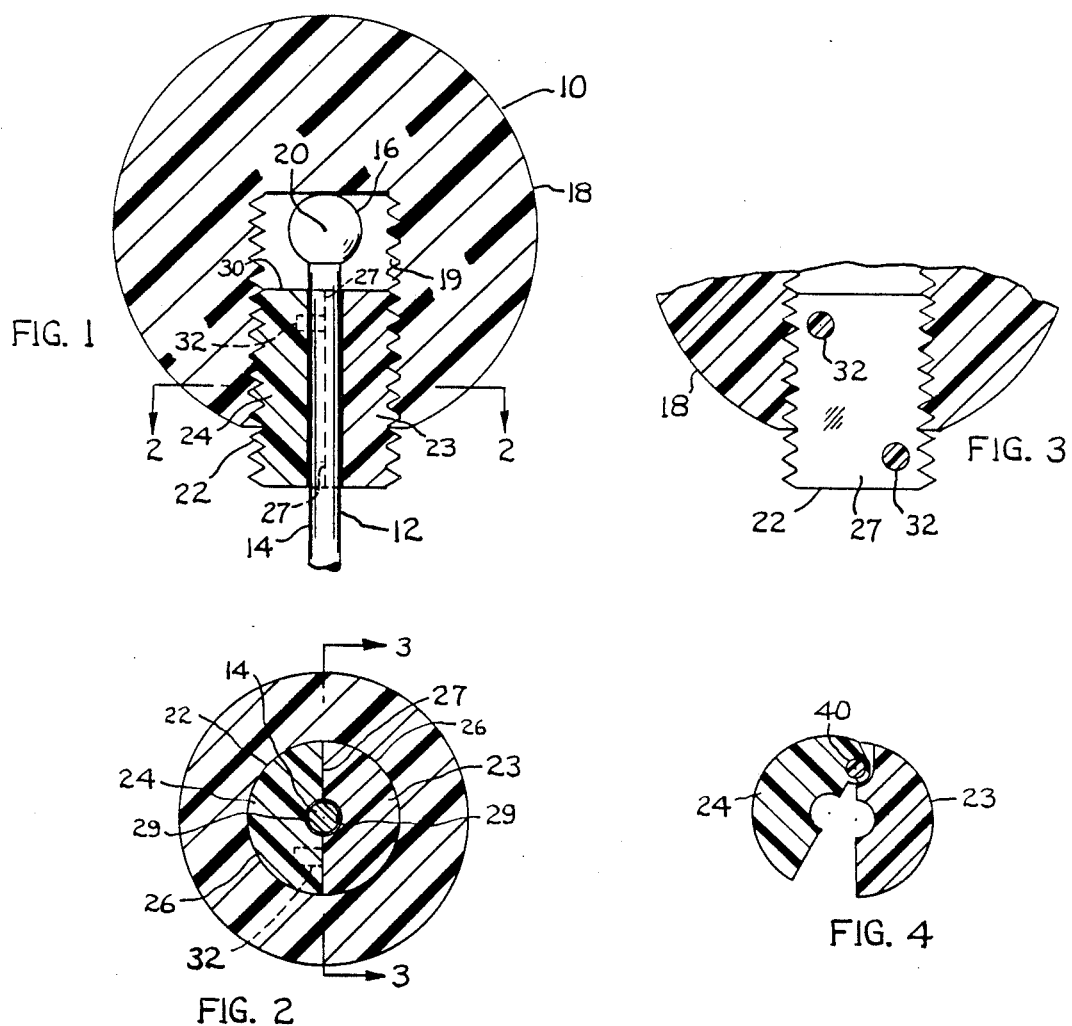

LIGHT REFLECTING ANTENNA BALL

BACKGROUND AND SUMMARY OF THE INVENTION

This invention relates to an ornament installable on an antenna rod of an automotive vehicle, motorcycle, bicycle or any vehicle possessing an antenna in the form of a colorful light reflecting ball.

The ornament of this invention preferably has a ball-shaped configuration, although other configurations are possible. My invention concerns primarily a mechanism for quickly and easily attaching the ornament body to the antenna, without special tools or adhesives. The attachment mechanism is designed so that the ornament body can be easily and quickly removed from the antenna, without harm to the antenna. Ornaments embodying this invention can be manufactured at relatively low cost; consequently such ornaments can have a relatively small overall volume, such that charges for packaging, transportation and point-of-sale display can be relatively low.

BRIEF DESCRIPTION OF THE DRAWINGS

FIG. 1 is a sectional view taken through an ornament embodying the invention. The ornament is shown installed on the upper end of an automotive vehicle radio antenna.

FIG. 2 is a sectional view on line 2—2 in FIG. 1.

FIG. 3 is a fragmentary sectional view taken on line 3—3 in FIG. 2.

FIG. 4 is sectional view taken through a split plug structure that can be used to mount the FIG. 1 ornament on a car radio antenna.

DESCRIPTION OF A PREFERRED EMBODIMENT OF THE INVENTION

FIG. 1 shows an ornament 10 of this invention installed on the upper end of a conventional car radio antenna 12. The antenna includes an upstanding rod 14 having a spherical enlargement 16 on its upper end. Typically rod 14 will have a diameter of about one eighth inch, whereas spherical enlargement 16 will have a diameter of about one fourth inch.

The novel ornament, as shown in the drawings, comprises a ball-shaped ornament body 18 having an internally threaded socket (bore) 19 extending therein along a radial line extending from center 20 of the ball shape. As seen in FIG. 1, socket 19 extends a slight distance beyond center 20. The diameter of socket 19 is somewhat greater than the diameter of spherical enlargement 16, such that the ornament body 18 can be easily installed over (onto) the upper end of the antenna.

Ornament body 18 is retained on the antenna by means of a split plug 22. The plug is split along an axial plane extending through the plug diameter, such that the two generally similar semi-cylindrical plug sections 23 and 24 are provided. Each semi-cylindrical plug section 23 or 24 has a flat internal face 27, and a cylindrically curved outer face 26. Each outer face 26 has thread grooves therein, such that when the two plug sections are manually put together (with faces 27 in abutment) a continuous helical thread is formed on the outer cylindrical surface of the split plug.

Each flat plug face 27 has a semi-cylindrical recess 29 extending axially therealong, whereby the two plug sections can be positioned around antenna rod 14 in the space below ornament body 18. After the plug sections have been positioned on antenna rod 14 the split plug can be manually turned to thread into socket 19. The split plug can be screwed into the socket until its upper end face 30 is spaced a slight distance below spherical enlargement 16, as shown in FIG. 1. Alternately, the plug can be turned a further amount until plug end face 30 is engaged with spherical enlargement 16. The plug has an axial length that is about the same as the axial depth of socket 19. Therefore, no matter how far the plug is threaded into the socket a portion of the plug will remain outside the ornament body. This "outside" portion of the plug can be manually grasped to unthread the plug from the ornament body whenever it is desired to remove the ornament from the antenna.

Removal of the ornament from the antenna involves a complete unthreading of the split plug from socket 19, a manual separation of the plug sections away from the antenna rod 14, and a lifting of ornament body 18 from spherical enlargement 16. Initial installation of the ornament body on the antenna is essentially a reverse operation, i.e. placement of body 18 on spherical enlargement 16, positionment of plug sections 23 and 24 around rod 14, and manual threading of the split plug into socket 19. A tool may be required.

If the split plug is threaded to the position shown in FIG. 1 the ornament body 18 will have a loose fit on the antenna; recess surfaces 29 will act as a rotary bearing on rod 14, such that the ornament can rotate freely on the rod 14 axis. If the external face of body 18 is multi-colored the rotating ornament will have a distinctive eye-catching appearance. Rotation of body 18 will (or may) occur as an incidental effect of vehicle movement on the highway. Relative wind forces acting on the surface of body 18 will tend to provide the rotational movement. The ornament body may have vanes or ribs formed thereon to accent the rotational motion.

If split plug 22 is threaded into socket 19 to a point where plug end face 30 engages spherical enlargement 16, the ornament body will (or may) be clamped to the antenna The ornament will thus not rotate on the antenna in the above-described fashion.

If desired, the split plug 22 can be provided with an alignment mechanism for holding plug sections 23 and 24 in place on rod 14 during the operation of threading the split plug into socket 19. As shown in FIGS. 1 through 3, the alignment mechanism comprises two cylindrical pins 32 projecting from the flat internal face of plug section 23, and two cylindrical recesses formed in the internal flat face of plug section 24. The pins align with the recesses so that when the two plug sections are placed around antenna rod 14 the pins will extend into the recesses A manual turning force can be applied to the split plug without fear that pins 32 will inadvertently slip out of the mating recesses.

The drawings show two pins on plug section 23 and two mating recesses in plug section 24. However, each plug section can have one pin and one recess arranged symmetrically so that when the two plug sections are abutted together, one pin on each plug section will extend into a recess in the other plug section. The split plug can be designed so that the two plug sections are identical (thereby reducing tooling costs).

FIG. 4 illustrates an alternative mechanism for aligning the two plug sections 23 and 24. In this case the two plug sections are hingedly connected together for swinging motion around a hinge axis defined by a hinge pin 40. The two plug sections are formed with integral ears and ear-accommodating recesses adapted to permit at least limited swinging motion of one plug section relative to the other plug section. The FIG. 4 construction is somewhat more costly than the FIG. 1 construction FIG. 1 represents a preferred form of the invention.

The drawings show ornament body 18 as having a ball shape. However, other shapes may also be utilized, e.g. a football shape, or an animal shape such as Mickey Mouse. The displayed body will ordinarily be an ornament of some kind. However, it could serve some other purpose, such as a distress signal indicating the need for assistance on the highway. In such a situation body 18 might be part of a sign having the word HELP thereon; body 18 would only be attached to the radio antenna during an emergency situation

I claim:

1. A light reflecting ornament for attachment to an automotive radio antenna, wherein said antenna includes an upstanding rod and an enlargement on the upper end of the rod, said ornament comprising;
   an ornament body having a threaded socket extending therein;
   a split plug having external threads mated to the threads in the above-mentioned socket, whereby said split plug can be threaded into the socket;
   said plug being split along an axial plane extending through the plug diameter, whereby said plug is comprised of two separable semi-cylindrical plug sections; each plug section having a flat internal face extending along the plug diameter and a cylindrical threaded outer face;
   each plug section having a semi-cylindrical recess in its flat internal face, whereby the two plug sections can be positioned around an antenna rod prior to threading the plug into the threaded socket.

2. The ornament of claim 1 and further comprising an alignment means for holding the two plug sections in a cylindrical configuration when they are positioned around an antenna rod.

3. The ornament of claim 2 wherein said alignment means comprises two pins projecting from a flat face on one plug section, and two mating recesses in the flat face on the other plug section.

4. The ornament of claim 1 wherein said plug has an axial length that approximates the length of the socket, whereby when the plug is threaded into the socket the end of the plug abuts the enlargement on the antenna rod, so that an end portion of the plug necessarily remains outside the socket.

5. The ornament of claim 4 wherein said ornament body has a ball shape; said threaded socket extending into the ball shaped body along a radial line to a point slightly beyond the center of the ball, whereby the enlargement on the antenna rod will be located approximately at the center of the ball.

* * * * *